United States Patent [19]
Barth

[11] 3,837,179
[45] Sept. 24, 1974

[54] FLEXIBLE COUPLING

[76] Inventor: Harald Barth, Hermannstrasse 103, Neunkirchen, Saar, Germany

[22] Filed: Mar. 7, 1973

[21] Appl. No.: 338,901

[30] Foreign Application Priority Data
Mar. 10, 1972  Germany............................ 2211512

[52] U.S. Cl. .................. 64/14, 64/11 R, 64/27 NM
[51] Int. Cl. ............................................. F16d 3/64
[58] Field of Search ....... 64/14, 16, 9, 27 NM, 11 R

[56] References Cited
UNITED STATES PATENTS

| | | | |
|---|---|---|---|
| 2,764,003 | 9/1956 | Croset.................................... | 64/14 |
| 2,989,857 | 6/1961 | Helland et al...................... | 64/27 R |
| 3,638,454 | 2/1972 | Croset.................................... | 64/9 |
| 3,729,953 | 5/1973 | Wanzer................................. | 64/14 |

FOREIGN PATENTS OR APPLICATIONS

| | | | |
|---|---|---|---|
| 509,540 | 4/1955 | Italy....................................... | 64/14 |
| 575,163 | 2/1946 | Great Britain.......................... | 64/14 |

Primary Examiner—Samuel Scott
Assistant Examiner—Randall Heald
Attorney, Agent, or Firm—Michael S. Striker

[57] ABSTRACT

A flexible coupling wherein the jaws of one flange are normally interdigitated with the jaws of the other flange to form substantially cylindrical chambers for reception of elastically deformable cylindrical inserts which transmit torque between the flanges when one flange rotates to drive the other flange. At least one of the flanges has a hub and a rim which is separably connected to the hub by screws and can be moved, upon removal of screws, with the respective jaws in a direction away from the jaws of the other flange to thus permit convenient withdrawal of the inserts. The inserts are connected to a split ring which can pass over the hub when the latter is separated from the rim.

39 Claims, 5 Drawing Figures

FLEXIBLE COUPLING

BACKGROUND OF THE INVENTION

The present invention relates to flexible couplings in general, and more particularly to improvements in flexible couplings of the type wherein two coaxial flanges are provided with annuli of equidistant jaws which are interdigitated to form a plurality of chambers each of which receives an elastic insert forming part of a torque transmitting device which rotates one of the flanges in response to rotation of the other flange or vice versa.

Flexible couplings of the just outlined character normally comprise torque transmitting devices wherein the elastic inserts are secured to a ring-shaped connecting element and wherein a damaged or destroyed torque transmitting device can be removed and replaced by a fresh torque transmitting device only in response to complete or nearly complete dismantling of the coupling. As a rule, the inserts of the torque transmitting device are subjected to very high mechanical and thermal stresses so that they must be replaced at frequent intervals. If a damaged torque transmitting device is to be removed, at least one of the flanges must be shifted axially away from the other flange through a distance which at least equals twice the maximum axial length of the torque transmitting device. This causes serious problems, especially in certain types of motors and transmission where the space is at a premium so that it is quite difficult to mount the flanges of a flexible coupling in such a way that one of the flanges is movable away from the other flange through the aforementioned distance. The situation is further aggravated if the flexible coupling is mounted in a heavy-duty machine, motor or transmission in which the axial displacement of one of the flanges necessitates the exertion of a substantial effort.

Another serious drawback of presently known flexible couplings wherein elastic inserts are received in chambers flanked by pairs of jaws forming part of different flanges is that the torque transmitting device is subject to excessive localized accumulation of heat which further contributes to rapid destruction of the torque transmitting inserts. Localized accumulation of heat is especially likely to occur in flexible couplings which are subjected to very high dynamic stresses, for example, when the magitude of torque which the inserts must transmit varies within a rather wide range.

Still another drawback of presently known flexible couplings is that the yieldability of elastic inserts (as considered in the circumferential direction of the coupling) is relatively low, even if the inserts consist of extremely soft elastomeric material.

SUMMARY OF THE INVENTION

An object of the invention is to provide a novel and improved flexible coupling wherein the elastic torque transmitting device can be replaced with little loss in time and in response to only partial dismantling of the coupling.

Another object of the invention is to provide a flexible coupling wherein the axial displacement of a minor portion of a single flange suffices to allow for withdrawal of a damaged torque transmitting device and for insertion of a fresh torque transmitting device.

A further object of the invention is to provide a flexible coupling with jaws and torque transmitting elements which are less likely to accumulate substantial amounts of heat than the corresponding parts in the presently known flexible couplings.

Still another object of the invention is to provide a flexible coupling wherein one of the flanges is movable angularly relative to the other flange through a relatively large angle without any damage to the torque transmitting device.

An additional object of the invention is to provide a novel and improved torque transmitting device for use in a flexible coupling.

A further object of the invention is to provide a novel and improved flange for use in a flexible coupling.

An additional object of the invention is to provide a flexible coupling which can transmit substantial amounts of torque even though its axial and radial dimensions are substantially smaller than the corresponding dimensions of conventional flexible couplings for transmission of identical torque.

The invention is embodied in a flexibe coupling which comprises coaxial first and second flanges including annuli of interdigitated jaws defining a plurality of chambers each flanked by a jaw of the first flange and a jaw of the second flange, and torque transmitting means comprising a plurality of preferably cylindrical elastically deformable inserts received in the chambers. At least one of the flanges further includes a hub, a rim extending radially beyond the hub and rigid with the respective jaws, and fastener means separably securing the rim to the hub. When the fastener means is removed or deactivated, the rim is movable with the respective jaws substantially axially of the flanges and away from the jaws of the second flange from an operative position in which the two annuli of jaws are interdigitated to a retracted position in which the jaws of the first flange are spaced apart from the jaws of the second flange to thus permit withdrawal of inserts from between the jaws of the second flange.

The torque transmitting means preferably further comprises a connecting element (e.g., a split ring) which supports and is movable with the inserts relative to the two flanges in the retracted position of the rim.

The novel features which are considered as characteristic of the invention are set forth in particular in the appended claims. The improved flexible coupling itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
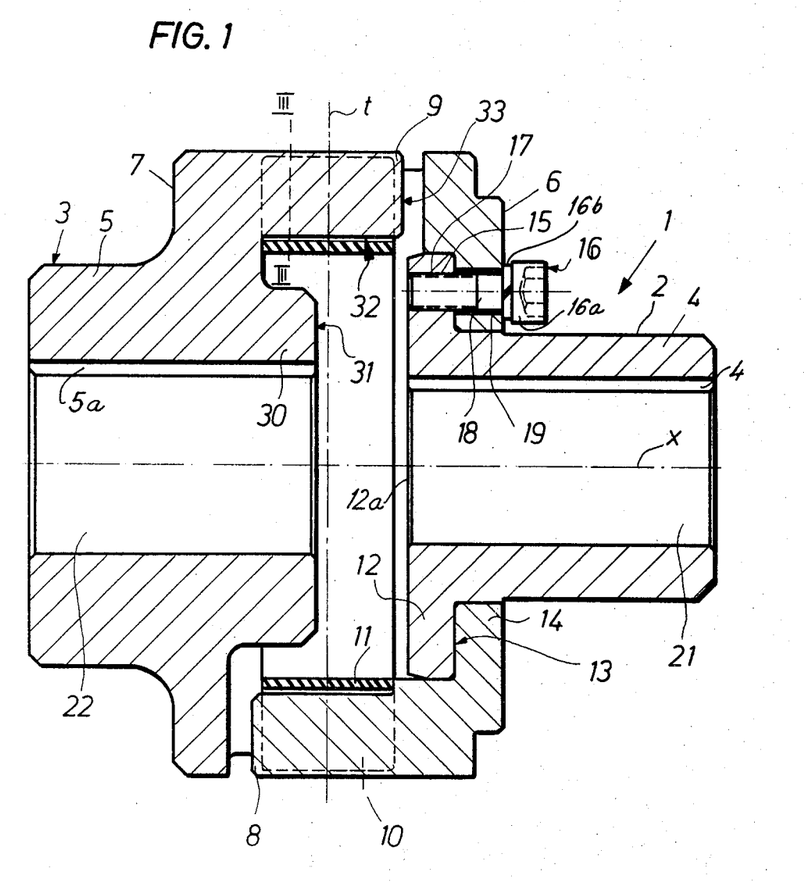
FIG. 1 is an axial sectional view of a flexible coupling which embodies one form of the invention and wherein only one of the flanges has a rim which is separable from the respective hub.
Figure 2:
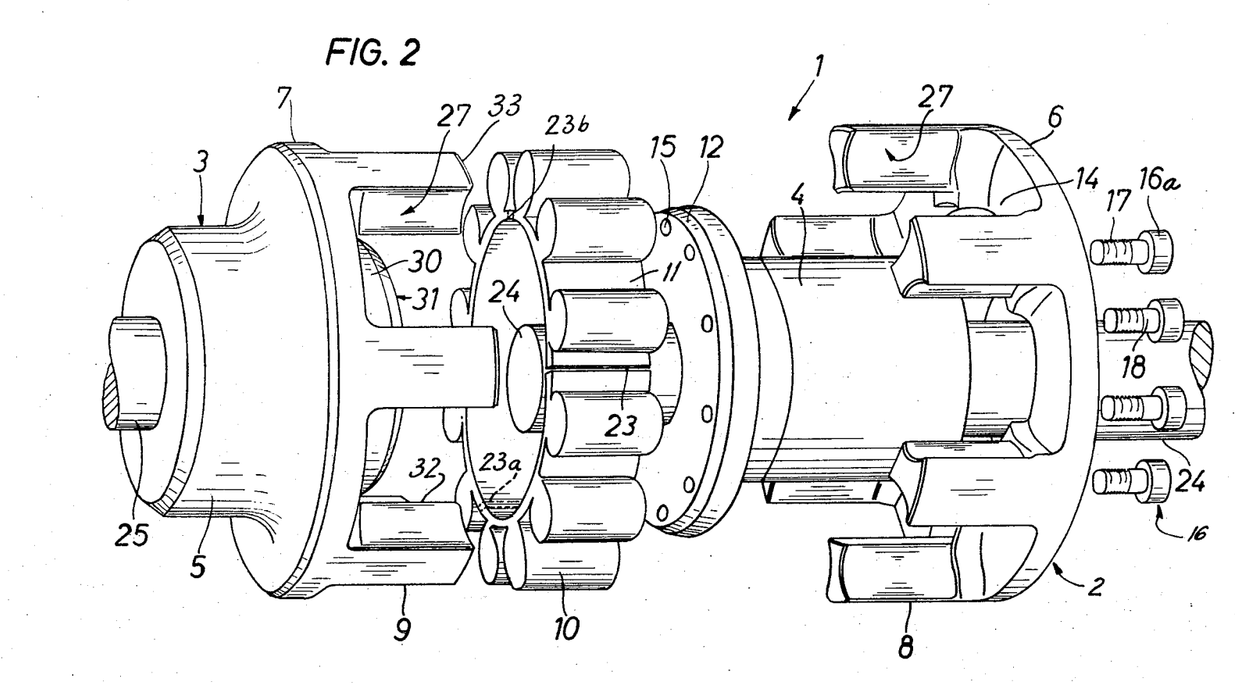
FIG. 2 is an exploded perspective view of the flexible coupling with the rim shown in retracted position.
Figure 3:
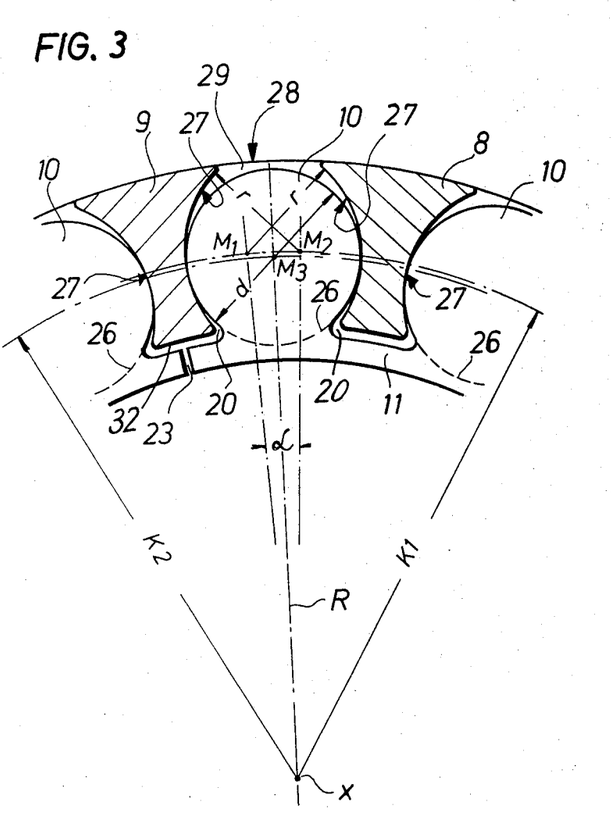
FIG. 3 is an enlarged fragmentary transverse sectional view taken along the line III—III of FIG. 1.

Referring first to FIGS. 1–3, there is shown a flexible coupling 1 which serves to transmit torque from a first shaft 24 to a coaxial or substantially coaxial second shaft 25, or vice versa. The coupling 1 comprises two coaxial flanges 2 and 3 which are substantially mirror-symmetrical to each other with reference to a plane $t$ which is normal to the common axis X of the shafts 24, 25 and flanges 2, 3.

The flange 3 comprises a cylindrical hub 5 and a rim 7 which is integral with and extends radially outwardly beyond the hub 5. The rim 7 is formed with an annulus of equidistant jaws 9 best shown in FIG. 2. The other flange 2 comprises a cylindrical hub 4 and a rim 6 which is separably secured to the hub 4 by means of screws 16 or analogous fasteners. The rim 6 of the flange 2 is integral with an annulus of jaws 8 which are preferably identical with the jaws 9 and are equidistant from each other. When the rim 6 assumes the operative position shown in FIG. 1, the jaws 8 are interdigitated with the jaws 9 of the rim 7 to form therewith a plurality of identical substantially cylindrical chambers 28 one of which is shown in FIG. 3.

The flexible coupling 1 further comprises a torque transmitting device which includes a set of cylindrical inserts 10 consisting of deformable elastomeric material and a ring-shaped connecting element 11 which is integral with the radially innermost portions of the inserts 10 and serves as a support or carrier for the inserts. Each of the inserts 10 is received in one of the chambers 28 so that it is flanked by a jaw 8 of the flange 2 and a jaw 9 of the flange 3. The axes of the cylindrical inserts 10 are parallel to the common axis X of the flanges 2 and 3. Each of the inserts 10 is assumed to constitute a right circular cylinder having a cylindrical peripheral surface, two flat end surfaces and two annular convex surfaces each extending between the cylindrical peripheral surface and one of the end surfaces. This can be seen in the upper portion of FIG. 1.

The connecting element 11 enables an operator to simultaneously introduce all of the inserts 10 into the spaces between the jaws 8 or 9, or to simultaneously withdraw all of the inserts 10 preparatory to replacement of the torque transmitting device with a fresh device.

Referring to the flange 2 in greater detail, it will be seen that the hub 4 is provided with a radially outwardly extending collar 12 which is adjacent to the flange 3 and that the rim 6 is provided with a radially inwardly extending collar 14 which overlies that side or surface (13) of the collar 12 which faces away from the flange 3. The collars 12 and 14 abut against each other when the rim 6 assumes the operative position of FIG. 1. The jaws 8, which are integral with the outermost portion of the rim 6, surround the collar 12 of the hub 4.

The collar 12 is provided with equidistant axially parallel tapped holes 15 which register with slightly larger holes 19 of the collar 14. Each of the screws 16 has a threaded shank or stem 18 which extends into one of the holes 15 so as to mesh with the collar 12 and which further extends through and outwardly beyond the exposed end face of the collar 14. The head 16a of each screw 16 is outwardly adjacent to the exposed end surface of the collar 14. An elastic washer 16b in the form of a split ring is preferably interposed between each of the heads 16a and the collar 14 of the rim 6. When the screws 16 are driven home, the collar 14 abuts against the surface 13 of the collar 12 whereby the rim 6 is held in the operative position in which the jaws 8 of the flange 2 are interdigitated with the jaws 9 of the flange 3 so as to properly confine the inserts 10 of the torque transmitting device in the respective chambers 28. The external threads of the shanks 18 of the screws 16 are indicated at 17.

The hubs 4 and 5 of the flanges 2 and 3 are respectively provided with axially extending through bores 21 and 22 for reception of the respective shafts 24 and 25. The hub 4 has an axially parallel internal flute 4a which can receive an external spline (not shown) of the shaft 24 or the outer portion of a key (not shown) the inner portion of which extends into a complementary flute machined into the periphery of the shaft 24. The hub 5 is also provided with an axially parallel internal flute 5a which can receive a spline of the shaft 25 or a portion of a key. This insures that the flanges 2 and 3 invariably share all angular movements of the respective shafts, or vice versa.

The hub of the one-piece flange 3 is provided with a relatively short cylindrical projection 30 which extends toward the hub 4 of the flange 2. The projection 30 has a flat and smooth front end surface 31 which is rather closely adjacent to the aforementioned symmetry plane $t$. The plane $t$ halves each of the chambers 28 and each of the inserts 10 in the fully assembled condition of the flexible coupling 1. Each of the jaws 9 has a flat or concave internal face 32 which is spaced apart from the cylindrical projection 30, as considered in the radial direction of the flange 3. The internal diameter of the connecting element 11 of the torque transmitting device exceeds the external diameter of the cylindrical projection 30. Each of the hubs 4 and 5 can be provided with a cylindrical projection 30.

The hub 4 of the flange 2 has a front end surface which is preferably coplanar with the front end surface 12a of the collar 12. The plane of the front end surface 12a is parallel to and spaced apart from the symmetry plane $t$. The front end surface 12a faces the front end surface 31 of the projection 30. The common plane of the front end faces 33 of the jaws 9 on the rim 7 of the flange 3 preferably coincides with or is closely adjacent to the plane of the front end surface 12a on the collar 12. This is clearly shown in FIG. 1.

A portion of the connecting element 11 extends into the annular space between the cylindrical projection 30 and the jaws 9 of the flange 3. This is desirable because it contributes to a reduction of the overall axial length of the coupling 1. In other words, that portion of the hub 5 which constitutes the cylindrical projection 30 can extend well into the space which is surrounded by the jaws 9. As mentioned before, the front end surface 31 is preferably closely adjacent to the symmetry plane $t$.

The front end surface 12a of the collar 12 is preferably smooth and is spaced apart from the symmetry plane $t$ by a distance which preferably only slightly exceeds the distance between the symmetry plane $t$ and the front end faces 33 of the jaws 9. This is of advantage because it results in a reduction of the overall axial length of the flexible coupling 1 and because it allows for removal of the entire flange 2 in a direction radially of the flange 3 as soon as the shaft 24 is withdrawn from the axial bore 21 of the hub 4 and the rim 6 is moved to a retracted or inoperative position (shown in FIG. 2) in which the jaws 8 of the flange 2 are axially spaced from the jaws 9 of the flange 3. If one desires to withdraw the entire flange 2 from the machine, motor or transmission wherein the flexible coupling 1 is being put to use, it is necessary to remove the screws 16 so as to allow for axial movement of the rim 6 to the retracted position of FIG. 2, and to withdraw the shaft 24 from the axial bore 21 or to move the entire shaft 24 radially together with the hub 4 of the flange 2. The front end surface 12a then bypasses the front end faces 33 of the jaws 9 on the flange 3.

FIG. 1 shows that the length of the jaws 8 and 9, as considered in the axial direction of the flanges 2 and 3, slightly exceeds the axial length of cylindrical inserts 10. For example, the length of each of the jaws 8 and 9 may exceed the axial length of an elastic insert 10 by six to nine percent. It will be noted that the axial length of the connecting element 11 shown in FIG. 1 equals the axial length of the inserts 10. The axial length of each jaw 8 or 9 is a multiple of the distance between the plane of the front end faces 33 and the plane of the front end surface 12a, i.e., the shortest distance between such planes (as considered in the axial direction of the flanges 2 and 3) is a small fraction of the length of a jaw 8 or 9.

FIG. 2 illustrates the flexible coupling 1 in partially dismantled condition, namely, the coupling 1 is dismantled to the extent which is necessary to allow for convenient removal of the torque transmitting device including the parts 10 and 11 and for convenient replacement of such torque transmitting device with a fresh torque transmitting device. As shown, the screws 16 are detached from the collar 12 of the hub 4 so that the entire rim 6, including the collar 14 and the jaws 8, can be shifted axially in a direction away from the flange 3. This provides room for withdrawal of cylindrical inserts 10 from between the jaws 9 of the flange 3. The illustrated connecting element 11 constitutes a split-ring consisting of the same elastomeric material as the inserts 10 and having an axially parallel slot 23 which can be expanded in response to deformation of the connecting element 11 so that the entire torque transmitting device can be moved radially of the flange 3 and away from the front end portion of the shaft 24. In other words, when the front end portion of the shaft 24 extends beyond the collar 12 of the hub 4, the width of the slot 23 in the connecting element 11 must be increased to such an extent that it at least equals the diameter of the front end portion of the shaft 24. The insertion of a fresh torque transmitting device takes place by repeating the just described steps in reverse order. Thus, the slot 23 of the connecting element 11 forming part of a fresh torque transmitting device is expanded so that the device can be slid onto the front end portion of the shaft 24 and the entire torque transmitting device is then shifted axially in a direction to the left, as viewed in FIG. 2, so that each pair of neighboring inserts 10 is received between two jaws 9 of a flange 3. The element 11 of a fresh torque transmitting device is preferably centered on the collar 12 and is thereupon moved axially to introduce the inserts 10 between the jaws 8 or 9 before the rim 6 is returned to the operative position of FIG. 1.

Referring again to FIG. 1, it will be seen that the maximum diameter of the collar 12 equals or is slightly less than the internal diameter of the connecting element 11 in undeformed condition of the torque transmitting device. This renders it possible to withdraw a damaged torque transmitting device from between the jaws 9 as soon as the rim 6 is separated from the hub 4 and is moved to retracted position away from the flange 3 so as to provide sufficient room for movement of a connecting element over and, if necessary, beyond the collar 12. The connecting element 11 is then expanded so that it can be slipped off the collar 12 by moving in the radial direction of the hub 4. It will be seen that the torque transmitting device can be removed and a fresh torque transmitting device inserted without necessitating any axial displacement of the hub 4 and/or shaft 24.

If desired, the connecting element 11 of the torque transmitting device may consist of two or more discrete arcuate sections. This renders it possible to rapidly remove a damaged torque transmitting device and to replace it with a fresh torque transmitting device. Each section of the connecting element 11 may carry one, two or more inserts 10. It is preferred to assemble a composite connecting element of arcuate sections having identical lengths, as considered in the circumferential direction of the connecting element. FIG. 2 shows, by way of example, that the connecting element 11 may be provided with two additional axially parallel slots (indicated at 23a, 23b and shown by broken lines because they constitute an optional feature of the torque transmitting device). Each section of a tripartite connecting element preferably extends along an arc of about 120° and carries one third of the total number of inserts 10. It will be readily appreciated that a torque transmitting device which employs a composite connecting element for the inserts can be installed or removed without necessitating any deformation of the sections of the connecting element. Therefore, the latter can consist of relatively rigid material which need not be the same as the material of the inserts 10.

FIG. 3 illustrates one jaw 9 of the flange 3 and the adjacent jaw 8 of the flange 2. It will be noted that the chambers 28 between the concave side faces 27 of the jaws 8 and 9 have a substantially cylindrical shape but that each thereof is open at its radially outermost end. As mentioned before, each of the inserts 10 is assumed to be a right circular cylinder having a constant cross-section all the way between its axial ends. The diameter of the insert 10 in the central portion of the FIG. 3 is indicated at d. The distance between the axis M3 of this insert and the common axis X of the flanges 2 and 3 is shown at K2. The axes M3 of all of the inserts 10 are located at the same distance (K2) from the axis X. Each of the concave side faces 27 has a radius of curvature r and a center of curvature M1 (side faces 27 of jaws 8) or M2 (side faces of jaws 9). All of the centers M1, M2 are located on a circle having a radius K1 which slightly exceeds the distance K2 between the axes M3 of inserts 10 (in undeformed condition of the torque transmitting device) and the common axis X of the flanges 2 and 3.

It will be noted that the ring-shaped connecting element 11 is integral with the radially innermost portions of the cylindrical inserts 10. The broken lines 26 indicate those portions of the inserts 10 which are integral with the adjacent portions of the connecting element 11. The thickness of the connecting element 11 (as considered in the radial direction of the coupling 1) is preferably small; this is desirable in order to enhance the elasticity of the element 11 and to thus allow for more convenient removal of a damaged torque transmitting device or insertion of a fresh torque transmitting device. Furthermore, such relatively thin connecting element 11 contributes to a reduction of the radial dimensions of the coupling 1.

The chamber 28 shown in the central portion of FIG. 3 is bounded in part by the left-hand concave side face 27 of the jaw 8 and in part by the right-hand concave side face 27 of the jaw 9. Due to the aforementioned positioning of centers of curvature M1 and M2 of the concave side faces 27 on the jaws 8 and 9, the side faces 27 define with the cylindrical peripheral surface of the corresponding insert 10 a substantially crescent-shaped clearance 29 which allows for proper cooling of the jaws as well as for proper cooling of the insert 10. It will be noted that the width of the crescent-shaped clearance 29 increases in direction from both ends of the clearance toward the radially outermost portion of the respective insert 10. In addition, each of the concave side faces 27 defines with the cylindrical peripheral surface of the adjacent insert 10 a substantially sickle-shaped clearance 20 which is outwardly adjacent to the connecting element 11 and is located radially inwardly of the respective crescent-shaped clearance 29. It will be noted that the maximum width of each of the sickle-shaped clearances 20 may be considerably less than the maximum width of the corresponding crescent-shaped clearance 29. It can be said that each pair of associated sickle-shaped clearances 20 forms a crescent-shaped clearance which is interrupted in its central portion due to integral connection of the respective elastic insert 10 to the connecting element 11 of the torque transmitting device.

The reference character R shown in FIG. 3 denotes the maximum radius of the flexible coupling 1, i.e., the distance between the common axis X of the flanges 2, 3 and the convex outer faces of the jaws 8 and 9. Such outer faces form part of a cylindrical surface as shown in the upper portion of FIG. 3. FIG. 3 further shows that the radius of curvature of each concave side face 27 of a jaw 8 is identical with the radius of curvature of each concave side face 27 of a jaw 9. The two radii r which are shown in FIG. 3 intersect each other in a plane which includes the axis X and the axis M3 of the respective cylindrical insert 10 in undeformed condition of the torque transmitting device. The formation of crescent-shaped clearance 29 is attributed to the aforedescribed selection of the distances K1 and K2 and to the fact that each of the centers of curvature (M1 and M2) is located on the periphery of a circle having the radius K1 which slightly exceeds the distance K2 between the axis M3 of an insert 10 and the axis X. In the illustrated embodiment, the radius K1 exceeds the distance K2 by about 2 percent. The diameter $d$ of each insert 10 is less than $2r$ (wherein $r$ is the radius of curvature of a concave side face 27). For example, each radius $r$ may be between 60 and 70 percent of the diameter $d$. Of course, the inserts 10 will change their configuration when the coupling transmits torque because each of the inserts is then subjected to deformation by the adjacent concave side faces 27 of the respective jaws 8 and 9. The diameter of the circle having the radius K1 is preferably three to nine times greater than the diameter $d$ of an insert 10.

The crescent-shaped clearances 29 are desirable for several reasons. Thus, they enhance the elasticity of the flexible coupling by allowing for a reasonable amount of angular displacement of one flange relative to the other flange. The extent of such angular displacement depends on the extent to which the inserts 10 can be deformed by the adjacent concave side faces 27, i.e., on the amount of free space which is available in the chambers 28 between the respective side faces 27 and the peripheral surfaces of the inserts 10 in undeformed condition of the torque transmitting device. In many presently known flexible couplings, the elastic inserts can undergo minor deformation only or nearly exclusively in the axial direction of the coupling. The crescent-shaped clearances 29, together with the sickle-shaped clearances 20, enable the inserts 10 to undergo substantial deformation in the radial direction of the flexible coupling 1. Consequently, the angular position of the flange 2 relative to the flange 3 (or vice versa) can be changed to an extent which is much greater than in conventional couplings wherein the elastic inserts cannot be deformed in the radial direction but only in the axial direction of the flanges. Substantial angular displacement of one flange relative to the other flange is often desirable, for example, for smooth starting of a rotary part which receives torque from the shaft 24 or 25, for smooth application of brakes and/or for reducing the natural oscillation frequency of the aggregate which embodies the flexible coupling. The sickle- and crescent-shaped clearances 20 and 29 further compensate for some misalignment of the flanges and/or shafts, especially if the shafts are parallel with but radially offset relative to each other, e.g., if the axis of one of the shafts 24, 25 is located at a level above the axis of the other shaft or if the two axes are located in a common horizontal plane but are not in exact alignment with each other.

It was found that the dimensions of the clearances 20 and 29 are quite satisfactory for desirable deformation of inserts 10 or 110 if the radii of curvature $r$ of the concave side faces 27 are smaller than the median diameter of an insert. For example, each radius $r$ may have a length which is between 50 and 70 percent of the median diameter of an insert, most preferably between 55 and 58 percent (in undeformed condition of the insert).

As mentioned before, the space which is taken up by the clearance 29 preferably exceeds the space which is taken up by the corresponding pair of clearances 20. This can be achieved by appropriate selection of the radius K1 and the distance K2. In the embodiment of FIG. 3, the radius K1 exceeds the distance K2 by 2 percent. The difference can be in the range of 0.5 to 3 percent, preferably about 1 percent.

An advantage of jaws whose concave side faces are longer than the inserts 10 or 110, as considered in the axial direction of the coupling, is that the confined inserts have room for axial expansion in addition to expansion which is afforded due to the provision of clearances 20 and 29. This enhances the elasticity of the coupling, i.e., it contributes to turnability of one flange relative to the other flange. Still further, such selection of the length of side faces of the jaws allows for more satisfactory aeration of inserts and for more satisfactory removal of heat. As a rule, the length of jaws will exceed the length of the inserts by 6–9 percent. Still further, such selection of the length of jaws and inserts allows for at least some misalignment of the two shafts; for example, the axis of one of the shafts can be slightly inclined relative to the axis of the other shaft.

The angle alpha shown in FIG. 3 denotes the angular distance between the centers of curvature (M1 and M2) of two adjacent concave side faces 27. This angle is preferably between 4° and 8°.

Figure 5:
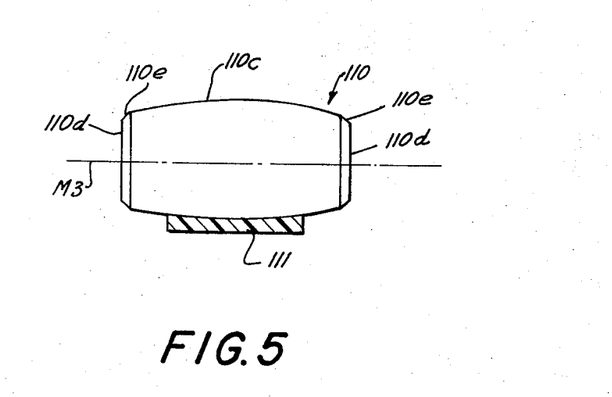
FIG. 5 is a fragmentary axial sectional view of modified torque transmitting means which can be utilized in the flexible coupling of FIG. 1 or 4.

Referring to FIG. 5, there is shown a portion of a slightly modified torque transmitting device which includes a ring-shaped connecting element 111 consisting of synthetic plastic material and a set of barrel-shaped (substantially cylindrical) torque transmitting inserts 110. It will be noted that each of the inserts 110 (only one shown in FIG. 5) has a peripheral surface 110c, two end surfaces 110d and two chamfers 110e each extending between the peripheral surface 110c and one of the end surfaces 110d. The axial length of the connecting element 111 is only a small fraction of the axial length of the illustrated insert 110. When the elastic insert 10 shown in the central portion of FIG. 3 is replaced by a barrel-shaped insert 110, the radius of curvature r of each concave side face 27 is preferably between 60 and 70 percent of the median or average diameter of the insert 110. Such median or average diameter is less than the maximum diameter of the peripheral surface 110c but exceeds the diameter of an end surface 110d.

It is also within the purview of the invention to employ a torque transmitting device wherein the connecting element 11 or 111 is connected with the inserts 10 or 110 by radially outwardly extending webs. The structure shown in FIG. 3 or 5 (wherein a portion of each insert constitutes an integral part of the connecting element as best shown at 26 in FIG. 3) is preferred at this time because such construction renders it possible to reduce the radial dimensions of the flexible coupling. As a rule, the maximum diameter of the hub of each flange is determined by the diameter of the respective shaft. Therefore, and if the connecting element is to be movable over the hub of the flange which comprises a separable rim, its internal diameter must at least slightly exceed the maximum diameter of the hub. By incorporating portions of the inserts into the connecting element (as shown at 26 in FIG. 3), one can reduce the width of the torque transmitting device, as considered in the radial direction of the flexible coupling so that neither the maximum diameter of the hub nor the maximum diameter of the entire flexible coupling must be selected in dependency on the dimensions of the torque transmitting device.

The convex annular surface portions of the inserts 10 or the chamfers 110e of the inserts 110 facilitate convenient introduction of such inserts into the spaces between the jaws of the one or the other flange. The barrel-shaped inserts 110 of FIG. 5 exhibit certain advantages during their deformation when one of the flanges transmits torque to the other flange. Thus, if the barrel-shaped inserts 110 are used in chambers 28 of the type shown in FIG. 3 of the drawing, both axial ends of each concave side face 27 are spaced apart from the respective insert 110 because the diameters of end surfaces 110d of such inserts are smaller than the maximum diameters of the respective peripheral surfaces 110c. Thus, when an insert 110 undergoes deformation, its material can fill the spaces at both axial ends of the respective chamber 28. It was found that the spring characteristic of an elastic barrel-shaped insert 110 is more satisfactory than that of an insert which constitutes a right circular cylinder, especially if the concave side faces 27 of the jaws constitute portions of cylindrical surfaces. It can be said that the deformation of barrel-shaped inserts is more gradual than the deformation of truly cylindrical inserts. Moreover, the provision of concave side faces on the jaws and the provision of barrel-shaped inserts enables an operator to assemble the flexible coupling even if the foremost end of one of the shafts is not in exact axial alignment with the foremost end of the other shaft. This is due to the fact that such side faces and such inserts allow for some tilting of one flange relative to the other flange.

The axial length of each insert 10 or 110 preferably exceeds its average or median diameter by 5–75 percent. As mentioned before, the median diameter of a barrel-shaped insert is greater than the diameter of an end surface 110d but smaller than the maximum diameter of the peripheral surface 110c. Such relationship between the axial lengths and median diameters is desirable because an insert whose axial length exceeds its median diameter is relatively slim or slender and thus contributes to a reduction of radial dimensions of the flexible coupling. Furthermore, the ratio of total external surface area to volume is greater which, in turn, allows for more satisfactory removal of heat which develops when the inserts are deformed while one of the flanges transmits torque to the other flange. It was found that the just discussed ratio of total exposed surface area to volume is particularly satisfactory when the length of an insert exceeds its median diameter by 20–60 percent and preferably by 40–50 percent.

The torque transmitting device of the present invention can be produced from a variety of elastomeric materials. As mentioned before, the connecting element is preferably integral with the inserts. The torque transmitting device may consist of natural or synthetic rubber, polyurethane, chloroprene polymerizates and/or a variety of other substances. The just enumerated substances are preferred at this time because they exhibit very satisfactory damping characteristics. However, such substances are not very satisfactory conductors of heat so that, in the absence of provision for satisfactory removal of heat, their useful life would be rather short. The aforementioned selection of ratios of axial length to median or average diameter has been found to contribute to more satisfactory removal of heat by insuring that the ratio of total exposed surface area to volume is rather high. Therefore, the useful life of such slender and relatively long inserts is much longer than the useful life of inserts consisting of identical material but having a length which merely equals or is even less than the median or average diameter. The hardness of the material of inserts 10 or 110 will be selected in dependency on the desired characteristics of the flexible coupling; for example, a flexible coupling can be furnished with several torque transmitting devices each of which has a different elasticity to thus allow for different relative angular movements of one flange with respect to the other flange.

Figure 4:
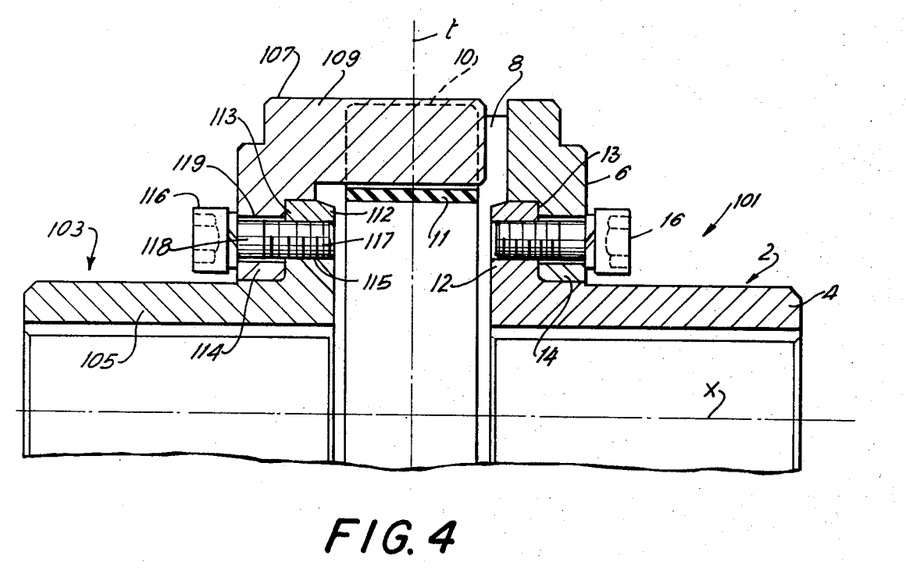
FIG. 4 is a fragmentary axial sectional view of a second flexible coupling.

Referring to FIG. 4, there is shown a second flexible coupling 101 wherein the flange 2 is identical with the similarly referenced flange of FIGS. 1 and 2. The flange 3 of FIGS. 1 and 2 is replaced by a flange 103 which is practically identical with and mirror-symmetrical to the flange 2. The flange 103 comprises a hub 105 having a collar 112 and a rim 107 having a collar 114. The fastener means for separably securing the collar 112 to the collar 114 includes a set of screws 116. All other reference characters used in the left-hand portion of FIG. 5 denote such parts of the flange 103 which are identical with or clearly analogous to the similarly referenced parts of the flange 2.

An advantage of the flexible coupling 101 is that the torque transmitting device including the inserts 10 and connecting element 11 can be removed without any axial shifting. Thus, all that is necessary is to detach the fasteners 16 and 116, to thereupon move the rims 6 and 107 apart so that the jaws 109 are located to the left and the jaws 8 are located to the right of the inserts 10, and to thereupon expand the connecting element 11 so that it can be slipped radially off the shaft for the flange 2 or 103, provided that such shaft extends into the space surrounded by the connecting element 11. In the embodiment which is shown in FIG. 4, the connecting element 11 need not have a slot 23 because neither of the flanges 2, 103 has a part similar to the projection 30 shown in FIG. 1. Consequently the entire torque transmitting device can be removed in a direction radially of the axis X as soon as the rims 6 and 107 are moved apart sufficiently to provide between the jaws 8 and 109 a clearance whose width at least equals the axial length of the inserts 10. As mentioned before, the connecting element 11 shown in FIG. 4 will be provided with one or more slots 23 if at least one of the hubs 4, 105 has a projection corresponding to the projection 30 shown in FIG. 1 or when the shaft for the flange 2 or 103 extends beyond the respective hub 4 or 105 toward the hub of the other flange.

An advantage of the flexible coupling 101 is that the torque transmitting device can be removed radially of the axis X as soon as the rims 6 and 107 are shifted apart through distances which respectively equal the axial length of the jaws 8 and 109 or which equal the axial length of the torque transmitting device. The ring-shaped connecting element 11 is then free to move radially without any expansion if the hub 4 and/or 105 does not have a projection corresponding to the projection 30 of FIG. 1 and if the shaft for the flange 2 or 103 does not extend beyond the hub 4 or 105. The coupling 101 will be used in aggregates where the rim 6 or 107 cannot be moved through a distance which exceeds the length of the jaws 8 or 109.

The flexible coupling 1 of FIGS. 1 to 3 will be used in aggregates wherein the rim 6 can be moved to a retracted position through a distance which equals or exceeds the combined axial length of the jaws 8 and torque transmitting device and which preferably exceeds twice the axial length of a jaw 8 or 9 or twice the axial length of an insert 10. This renders it possible to withdraw the inserts 10 from between the jaws 9 and to move the connecting element 11 radially of the axis X, either without or upon expansion of the connecting element 11, depending upon whether the hub 5 is provided with the projection 30 and whether or not the shaft 24 or 25 extends into the space between the collar 12 and hub 5.

The improved flexible coupling can further serve to facilitate convenient and time-saving removal of a transmission from an aggregate wherein a prime mover drives a machine by way of a transmission which is installed between the flexible coupling and the prime mover, i.e., the output shaft of the transmission may constitute one of the shafts 24, 25 shown in FIG. 2. If the transmission is to be removed without any dismantling of the prime mover, the rim 6 shown in FIGS. 1 and 2 is moved to the retracted position of FIG. 2 and the transmission (with the shaft 24 or 25 and the corresponding flange of the flexible coupling 1) can be removed from the aggregate as soon as its input shaft is disconnected from the prime mover. The torque transmitting device 10, 11 can be removed in its entirety prior to removal of the transmission or its connecting element 11 is simply slipped onto or beyond the collar 12 so as not to interfere with removal of the transmission together with the shaft 24 and flange 2 or shaft 25 and flange 3.

The screws 16 or 116 can be replaced by other types of fasteners, for example, by eccentrics mounted on the rim and rotatable to engage adjacent portions of the hub, or vice versa. Also, the rim can be separably connected to the respective hub by bolts and nuts.

Without further analysis, the foregoing will so fully reveal the gist of the present invention that others can, by applying current knowledge, readily adapt it for various applications without omitting features which, from the standpoint of prior art, fairly constitute essential characteristics of the generic and specific aspects of the contribution to the art and, therefore, such adaptations should and are intended to be comprehended within the meaning and range of equivalence of the claims.

What is claimed as new and desired to be protected by Letters Patent is set forth in the appended claims:

1. In a flexible coupling, a combination comprising substantially coaxial first and second flanges including annuli of interdigited jaws defining a plurality of chambers each having a radially outer open end and each being flanked by a jaw of said first flange and a jaw of said second flange, said first flange further including a hub, a rim extending radially outwardly beyond said hub and rigid with the respective jaws, and fastener means separably securing said rim to said hub, said rim being movable upon separation from said hub substantially axially and away from the jaws of said second flange from an operating position to a retracted position in which the jaws of said first flange are axially spaced apart from the jaws of said second flange; and elastically deformable inserts received in said chambers, each of said inserts being a body of circular cross section having an axis parallel with the axis of said flanges and having a radially outer portion closely adjacent the outer open end of the respective chamber and a radially inner portion located nearest to said axis, said torque transmitting element further comprising a ring-shaped connecting element integral with said radially inner portion of said inserts and having an internal diameter which is at least equal the maximum diameter of said hub so that said connecting element can be moved over and beyond hub during withdrawal of said inserts from between the jaws of said second flange.

2. A combination as defined in claim 1, wherein said jaws have concave side faces bounding portions of the respective chambers, each of said concave side faces having a radius curvature greater than that of said inserts so that the latter engage at least in the unstressed condition thereof said side faces substantially with a line contact to provide on opposite sides of the line of contact clearance between said side faces and said inserts for the passage of cooling air therethrough.

3. A combination as defined in claim 1, wherein said second flange further includes a second hub, a second rim extending radially outwardly beyond said second hub and rigid with the respective jaws, and second fastener means separably securing said second rim to said second hub, said second rim being movable upon separation from said second hub substantially axially and away from the jaws of said first flange to a retracted position in which said inserts are withdrawable from between the jaws of said first flange.

4. A combination as defined in claim 3, wherein each of said inserts has a predetermined length, as considered in the axial direction of said flanges, the distance between said operative and retracted positions of each of said rims, as considered in the axial direction of said flanges, being at least equal to said predetermined length.

5. A combination as defined in claim 1, wherein each of said inserts has a predetermined length, as considered in the axial direction of said flanges, the distance between said operative and retracted positions of said rim, as considered in the axial direction of said flanges, being at least twice said predetermined length.

6. A combination as defined in claim 1, wherein said hub comprises a radially outwardly extending first collar and said rim comprises a radially inwardly extending second collar overlying said first collar in said operative position of said rim, said first collar being located between said second flange and said second collar.

7. A combination as defined in claim 6, wherein the jaws of said first flange are located radially outwardly of said first collar.

8. A combination as defined in claim 1, wherein at least one of said flanges comprises a cylindrical projection extending toward the other flange.

9. A combination as defined in claim 8, wherein said projection has an end surface facing said other flange and located in the region of a plane which is normal to the axis of said flanges and halves each of said chambers.

10. A combination as defined in claim 8, wherein said jaws are spaced apart from said projection, as considered in the radial direction of said flanges.

11. A combination as defined in claim 1, wherein the jaws of one of said flanges have front end faces located in a first plane which is normal to the axis of said flanges, the other of said flanges having a front end surface surrounded by the respective jaws and located in a second plane which is parallel with and closely adjacent to said first plane.

12. A combination as defined in claim 11, wherein each of said jaws has a predetermined length, as considered in the axial direction of said flanges, and the distance between said first and second planes is a small fraction of said predetermined length.

13. A combination as defined in claim 1, wherein said second flange further includes a coaxial cylindrical projection surrounded by the respective jaws and extending toward said first flange.

14. A combination as defined in claim 1, wherein said hub comprises a radially outwardly extending first collar and said rim comprises a radially inwardly extending second collar overlying said first collar in said operative position of said rim, said first collar being disposed between said second collar and said second flange and having a plurality of axially parallel tapped holes registering with holes provided in said second collar, said fastener means including screws each having a threaded shank received in one of said tapped holes and a head adjacent to that side of said second collar which faces away from said first collar.

15. A combination as defined in claim 1, wherein said connecting element comprises a deformable split ring supporting said inserts.

16. A combination as defined in claim 15, wherein said split ring consists of a plurality of discrete arcuate sections.

17. A combination as defined in claim 16, wherein said arcuate sections are of identical length, as considered in the circumferential direction of said split ring.

18. A combination as defined in claim 1, wherein each of said inserts has a predetermined length, as considered in the axial direction of said flanges, and said ring-shaped connecting element supporting said inserts has an axial length which equals or approximates said predetermined length.

19. A combination as defined in claim 1, wherein each of said inserts has a predetermined length, as considered in the axial direction of said flanges, and ring-shaped connecting element supporting said inserts an axial length which is substantially less than said predetermined length.

20. A combination as defined in claim 1, wherein said ringshaped connecting element is integral with each of said inserts.

21. A combination as defined in claim 1, wherein each of said inserts is a right circular cylinder.

22. A combination as defined in claim 1, wherein each of said inserts has a peripheral surface, two end surfaces, and a chamfer provided between said peripheral surface and at least one of said end surfaces.

23. A combination as defined in claim 1, wherein each of said inserts has a peripheral surface, two end surfaces, and a convex annular surface provided between said peripheral surface and at least one of said end surfaces.

24. A combination as defined in claim 1, wherein each of said inserts is a barrel-shaped body.

25. A combination as defined in claim 1, wherein each of said inserts is a cylindrical body having an axis parallel to the axis of said flanges, the axial length of each of said inserts exceeding the average diameter thereof by 5–75 percent.

26. A combination as defined in claim 25, wherein the axial length of each of said inserts exceeds the average diameter thereof by 20–60 percent.

27. A combination as defined in claim 26, wherein the axial length of each of said inserts exceeds the average diameter thereof by 40–50 percent.

28. A combination as defined in claim 1, wherein said torque transmitting means consists of a material selected from the group consisting of natural rubber, synthetic rubber, polyurethane and chloroprene polymerizates.

29. A combination as defined in claim 1, wherein each of said jaws has two concave side faces bounding portions of the respective chambers and having centers of curvature located on a circle whose center is located on the axis of said flanges.

30. A combination as defined in claim 29, wherein each of said inserts is a cylindrical body having an average diameter, the ratio of said average diameter to the diameter of said circle being between 1:3 and 1:9.

31. A combination as defined in claim 29, wherein each of said inserts is a cylindrical body having an axis parallel to the axis of said flanges, said side faces defining with the inserts in the respective chambers crescent-shaped clearances constituting the radially outermost portions of the respective chambers.

32. A combination as defined in claim 31, wherein the width of said clearances increases in a direction away from the axis of said flanges.

33. A combination as defined in claim 31, wherein each of said side faces further defines with the respective insert a substantially sickle-shaped clearance located radially inwardly of the respective crescent-shaped clearance.

34. A combination as defined in claim 1, wherein each of said inserts is a cylindrical body having an axis which is parallel to the axis of said flanges, said jaws having concave side faces bounding portions of the respective chambers and having centers of curvature located on a circle whose center is located on the axis of said flanges, the radius of curvature of each of said side faces being between 50 and 70 percent of the average diameter of said inserts.

35. A combination as defined in claim 34, wherein each of said radii of curvature is between 55 and 58 percent of said average diameter.

36. A combination as defined in claim 1, wherein each of said inserts is a cylindrical body having an axis parallel to the axis of said flanges, the axes of all said inserts being located at the same distance from the axis of said flanges and said jaws having concave side faces bounding portions of the respective chambers, the centers of curvature of said side faces being located on a circle whose center is located on the axis of said flanges and the radius of said circle bieng greater than the distance between the axis of said flanges and the axes of said inserts.

37. A combination as defined in claim 31, wherein said radius exceeds said distance by 0.5–3 percent.

38. A combination as defined in claim 37, wherein said radius exceeds said distance by about 1 percent.

39. A combination as defined in claim 1, wherein each of said jaws has a first predetermined length and each of said inserts has a second predetermined length, as considered in the axial direction of said flanges, said first length exceeding said second length by 6–9 percent.

* * * * *